March 31, 1925.
C. A. WHITSETT
SPOTLAMP
Filed March 28, 1922      2 Sheets-Sheet 1
1,531,469
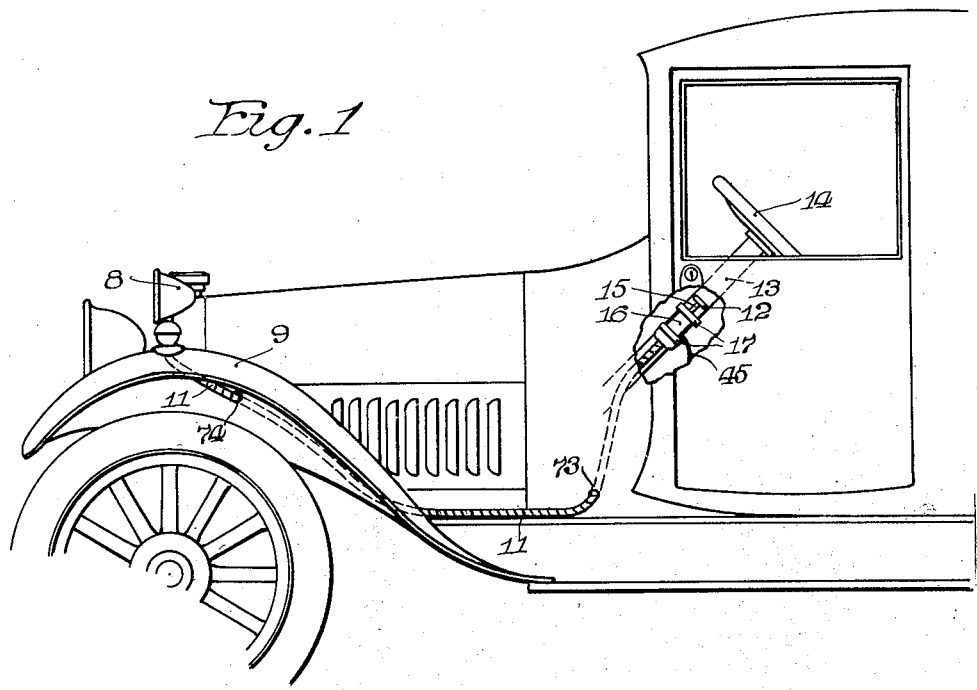
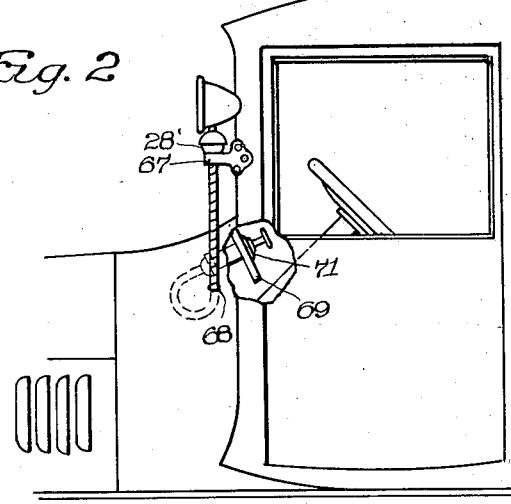
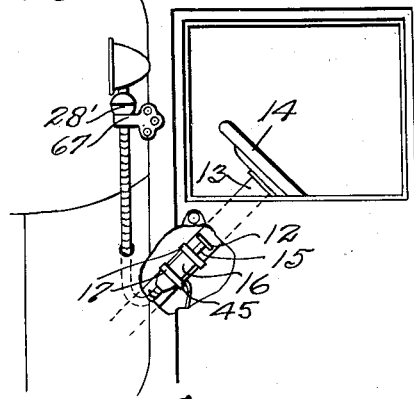
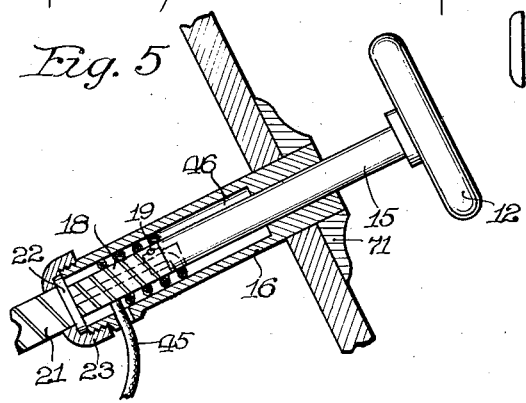
Inventor
Cameron A. Whitsett March 31, 1925.
C. A. WHITSETT
SPOTLAMP
Filed March 28, 1922
1,531,469
2 Sheets-Sheet 2
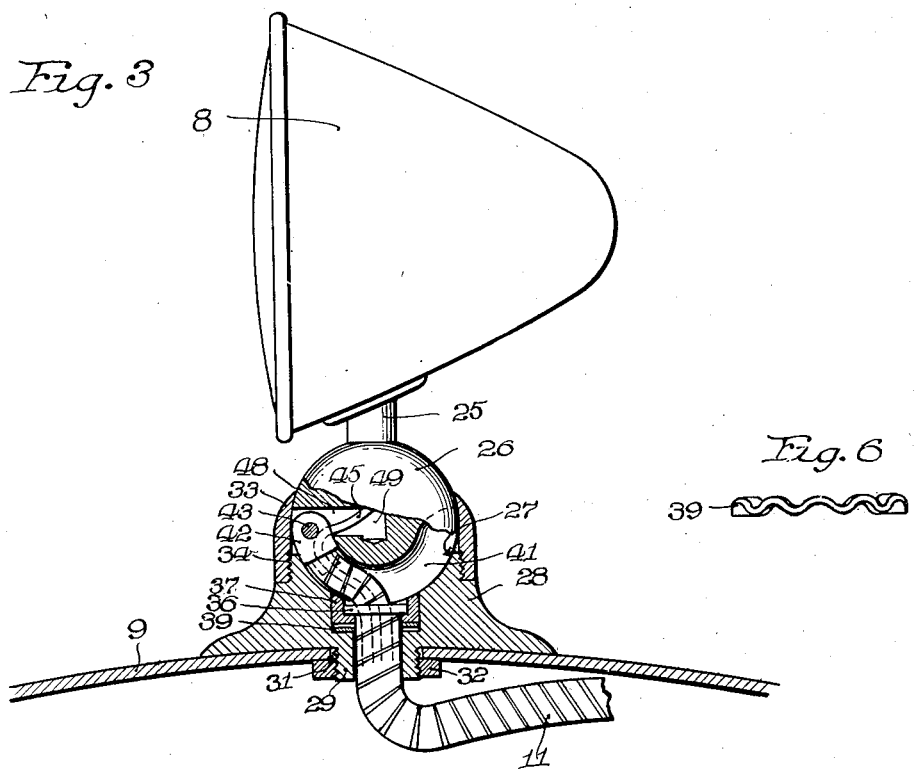
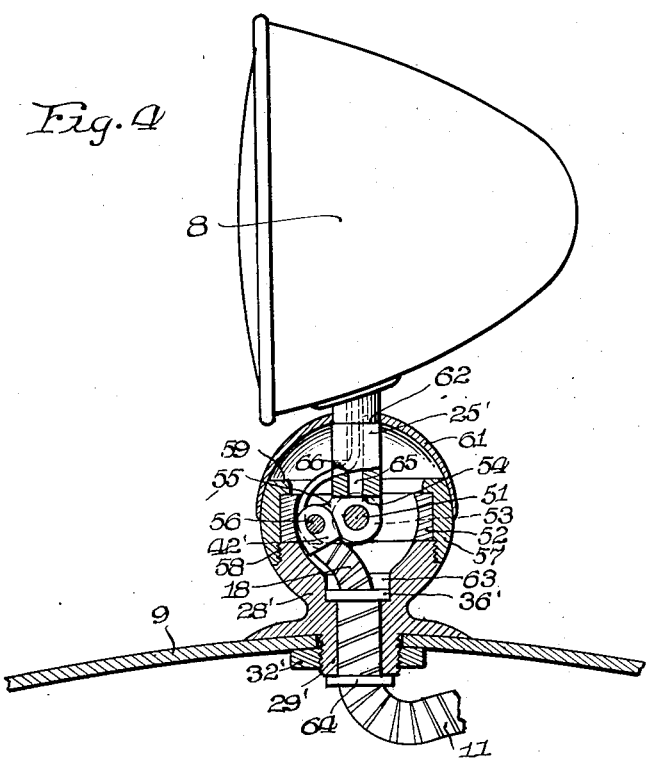
Inventor
Cameron A. Whitsett Patented Mar. 31, 1925.

1,531,469

UNITED STATES PATENT OFFICE.

CAMERON A. WHITSETT, OF CHICAGO, ILLINOIS.

SPOTLAMP.

Application filed March 28, 1922. Serial No. 547,381.

*To all whom it may concern:*

Be it known that I, CAMERON A. WHITSETT, a citizen of the United States, residing at Chicago, in the county of Cook and State of Illinois, have invented a certain new and useful Improvement in Spotlamps, of which the following is a full, clear, concise, and exact description, reference being had to the accompanying drawings, forming a part of this specification.

The present invention relates generally to spot lamps, and is particularly concerned with interior control mechanism adapted for operation from within the driver's compartment or the interior of sedans, limousines, and other closed cars. The utility of the invention is obviously not limited to automobile usage, as the device has application to boats and other situations where a remotely controlled spot lamp is desirable.

One of the principal objects of the present invention is to provide control mechanism employing a single flexible shaft for transmitting a universal adjusting motion to the spot lamp, this flexible shaft being characterized by a longitudinal as well as a rotary motion.

A further object of the invention is to provide improved control mechanism for converting the longitudinal and rotary motions of the operating member into a universal adjusting motion operable to incline the lamp in a plurality of planes.

Other objects will be apparent as the detailed description of the invention proceeds.

Referring to the accompanying drawings illustrating a preferred embodiment of my invention:

Figure 1 is a fragmentary elevational view of an automobile, illustrating one form of my invention applied thereto;

Fig. 2 is a similar view, illustrating a different application of my invention;

Fig. 3 is a detail sectional view on a larger scale, illustrating the embodiment of lamp adapted for mounting on the fender of the automobile;

Fig. 4 is a similar view of a modified arrangement;

Fig. 5 is a detail view of one form of the control member which is disposed within the car; and Fig. 6 is an enlarged detail view of the spring 39, and Figure 7 is a fragmentary view illustrating the spotlight mounting of Figure 2 with the control handle mounting of Figure 1.

A device of the present character has a much more extensive field and is more adaptable as an automobile accessory applicable to any and all types of cars when its mounting on the car does not necessitate any drilling of the corner rail of the automobile body or otherwise altering or modifying the ordinary body construction. This is one prominent advantage accruing to the present construction by virtue of the flexible shaft, which permits the lamp proper to be mounted on the automobile fender or at any other point, either remote from or close to the driver's compartment or tonneau, to which point the flexible shaft may be led through any part of the body of the car and around any angle which may be encountered in the various adaptations of the lamp. This also permits the controlling or actuating member to be mounted on the steering column, the dash, the side of the car body or any other preferred point most convenient and desirable to the driver.

In figure 1, the spot lamp 8 is mounted on the crown of one of the side fenders 9, and the flexible shaft, designated 11 in its entirety, is extended back into the closed body of the car by passing the same up through the floor-boards, or through the cowl or dash board at any preferred point. In this figure, the control handle 12 is illustrated as being mounted on the steering column 13 in convenient position below the steering wheel 14. In Fig. 2 the control handle is shown as mounted on the dash. Fig. 5 illustrates the latter arrangement in detail, and this figure will suffice to illustrate the mounting of the control handle in either situation, the particular manner of supporting the tubular guide or housing being practically the only difference between the two locations. The control handle 12 is mounted on the end of a shaft 15 having rotary and reciprocable motion in this tubular guide 16, this guide being secured by the clamping bands 17 or by any other suitable means to the steering column 13. The flexible shaft proper is designated 18 and is of any suitable tubular metal construction, or may conceivably consist of a solid wire operating upon the principle of a Bowden wire. The tubular construction of the shaft is preferable, however, and the end of this shaft is secured, as by the pin 19 or in any other suitable manner to the lower end of the shaft 15. The flexible shaft 18 is sheathed in a flexible housing or conduit 21 in which the shaft 18 has a comparatively snug fit, so as to reduce lost motion in the shaft 18. The sheath 21 is provided with a suitable flange 22 by which the sheath is firmly secured to the lower end of the tubular guide 16 by the provision of a nut 23 which engages in back of the flange 22 and has screw threaded engagement with the tubular guide 16.

In the construction shown in Fig. 3, the lamp 8 is supported on a stem 25, which in turn is supported on a ball 26 of a universal ball and socket joint. The ball seats in a spherical socket 27, the lower half of which is defined in the top of a suitable mounting base 28. The base 28 rests on the crown or any suitable part of the fender 9, and preferably has a threaded extension 29 passing down through a hole 31 in the fender. A nut 32 is threaded over this extension 29 to secure the mounting base 28 to the fender. Obviously, screws, rivets or any other suitable means may be employed for securing the base 28 to the fender in lieu of the extension 29 and nut 32. After the ball 26 has been seated in the spherical depression in the top of the mounting base 28, it is secured therein against endwise removal by screwing a cap 33 down over the reduced, threaded portion 34 of the mounting base 28. The cap 33 is converged spherically to embrace the ball 26 at a point above its horizontal diameter.

The depending threaded extension 29 is tubular and the sheath 21 and shaft 18 are extended up through this central opening. The end of the sheath is provided with a suitable flange or ring 36 which holds the sheath in place in the lamp mounting. The flange 36 preferably lies in the counterbore of a pressure ring or member 37. The member 37 is disposed in a shallow bore in the mounting base 28, and confined below this pressure member 37 is any suitable construction of spring 39 for imposing a yieldable pressure against the member 37 and through it against the bottom of the ball 26. As shown in Fig 6, this spring 39 may comprise a spring metal ring of sinuated contour and perhaps split at one point, the sinuated form of the ring normally exerting a restraining pressure against the bottom of the member 37 and against the ball 26. This pressure operating to thrust the ball upwardly against the spherical surface of the ring 33 will absorb or eliminate all vibration and rattle from the lamp and will function to hold the lamp in any adjusted position.

The lower part of the ball 26 is formed with a segmental groove 41, preferably of circular section, into which extends the flexible shaft 18. The upper end of the shaft 18 is fixedly secured to a pivot lug 42 which is disposed in an enlarged recess at one end of the groove 41. The pivot lug 42 is pivoted on a pin 43 which is passed transversely through the ball, this pin 43 and lug 42 tying the end of the flexible shaft 18 to the ball so that the shaft will be incapable of longitudinal movement without inclining the ball, and will be incapable of rotary movement without rotating the ball. It will be obvious that the end of the flexible shaft could have a permanent, fixed connection in the ball, but the provision of the lug 42 and pivot pin 43 is thought advantageous for the reason that it extends the amplitude of longitudinal motion of the flexible shaft and corresponding inclination of the ball 26 and lamp 8.

It will be obvious that with the lamp in the position illustrated, rotation of the flexible shaft in either direction will be operative to turn the lamp correspondingly through the lever arm existing between the pivot pin 43 and the axis of the ball. Similarly, it will be obvious that with the lamp in the position indicated, any thrusting or pulling motion imposed upon the flexible shaft will be translated into to or fro inclination of the ball 26 and lamp 8 as a result of the action of the flexible shaft tending to push the pivot pin upwardly or pull it downwardly. When the pin 43 is thrust upwardly, the extending portion of the arcuate groove 41 accommodates such additional length of shaft as is necessary to transmit the required tilting motion to the lamp, the walls of the groove 41 and the bottom of the spherical socket closely confining the flexible shaft so that there is no possibility of lost motion from lateral flexing of the shaft. The shaft 18 is sufficiently stiff, however, that a snug confinement on all sides is not necessary, the shaft being preferably sufficiently stiff that a considerable torsion or thrusting force can be exerted thereon without having all points of the shaft closely confined. Assume that the lamp has been rotated so that it is pointing directly to the rear. It will be obvious that any thrusting or pulling motion imparted to the flexible shaft 18 will also raise or lower the lamp when in this position. This is true for any angle to which the lamp may be turned. Thus, a universal adjustment of the lamp is obtained by the simple rotating and pushing and pulling on the control handle 12.

The electrical conductor for conducting the current to the bulb in the lamp 8 is preferably extended out to the lamp through the center of the tubular shaft 18. This makes the device self-contained and easier to install, and avoids twisting or breaking of the conductor in the manipulation of the lamp through its various planes of adjustment. The conductor 45 is illustrated as entering the flexible shaft 18 at or adjacent the tubular guide 16. This permits the conductor to be extended from a circuit at the dash or other convenient point within the car. As clearly shown in Figure 5, a convenient point of entrance for the wire into the tubular shaft, is at the juncture of the shaft 18 with the shaft 15. The conductor may be arranged to enter a lateral hole in the side of the shaft 15 and then be extended down through the end of the shaft 15 and into the tubular shaft 18. The guide or casing 16 has a counterbore 46 in its lower end in which the conductor may be given several turns about the shafts 15 and 18. The counterbore 46 is somewhat longer than the range of reciprocatory motion of the two shafts so that the several turns of the conductor may be extended out along the shafts or closed together for accommodating the reciprocating motion of the shafts and prevent shearing or breaking of the conductor 45. The slackness existing in these several turns of the conductor also permits angular motion of the shafts through a considerable range of movement without danger of breaking the conductor.

At the lamp end of the flexible shaft, the conductor is extended out through a central hole and a slot in the pivot lug 42 and is passed up through horizontal and vertical openings 48 and 49 in the ball 26, and up through a central bore extending through the stem 25. This arrangement permits the ball 26 to rotate and incline to any position within the range of movement of the lamp without injury to the conductor 45. A switch or other circuit controlling device may be interposed in the circuit at any suitable point, such as on the dash, or on the tubular guide or housing 16.

In the construction shown in Fig. 4, the stem 25' is extended down into the lamp mounting and has pivotal support on a transversely extending pin 51 in the center of a rotatable supporting ring 52. The ends of the pin 51 are carried in the ring 52, the pin extending diametrically thereof, and the pivotal portion of the stem has laterally extending hubs 53 to extend the length of bearing support of the stem substantially across the length of the pin. The lower end of the stem is bifurcated centrally, as indicated at 54, and on each side of this bifurcation has laterally extending arms 55. The pivot lug 42' to which the end of the flexible shaft 18 is secured, is pivoted between the ends of these spaced arms 55 upon a pin 56 extending between the arms and through the lug 42'. The bifurcation 54 provides an opening for receiving the lug 42' and the upper portion of the flexible shaft 18 when the stem 25 is rocked backwardly under upward thrusting movement of the flexible shaft 18.

The supporting ring 52 is mounted upon the upper flat surface of the mounting base 28', the exterior of which mounting base is of spherical contour for a purpose which will hereinafter appear. This mounting base is shown as being provided with a depending threaded extension 29' adapted to be passed down through a hole in the fender 9 and to receive a nut 32', similarly to the previous embodiment. The supporting ring 52 is retained in position by an outer confining ring 57, which closely embraces the ring 52, and which has threaded engagement at 58 with the mounting base 28'. A flange 59 on the upper end of the ring 57 overlies the ring 52 and confines the same against vertical displacement, the exterior of this confining ring 57 being also of spherical contour to conform to the spherical portion of the mounting base 28'. The lamp mounting is closed against the ingress of dirt and rain by a semi-spherical shell 61 which rests on a shoulder 62 on the stem 25' and moves with the stem in all of its rotary or inclining motions. This shell snugly embraces the spherical outline of the confining ring 57, and by reason of the spherical contour of the mounting base 28' is permitted to incline down to a relatively low angle in the adjusting movement of the lamp. It should be noted that a similar arrangement of shell 61 can be employed on the construction illustrated in Fig. 3 by giving the cap 33 and adjacent portion of the base 28 a spherical configuration.

The end of the sheath 21 has a suitable flange or ring 36' secured thereto, which engages in a counterbore 63 in the lower part of the mounting base 28', and a secondary ring or flange 64 may be provided on this sheath to engage against the bottom of the threaded extension 29' and thereby hold the sheath against longitudinal movement. The conductor 45 is extended out from the end of the flexible shaft 18 through a hole and slot in the pivot lug 42' and passes up into an axial bore 65 in the stem 25' through a suitable hole 66 entering the stem laterally. By this arrangement, there is no possibility of cramping or breaking the conductor in the various adjusting movements of the stem 25'.

The supporting ring 52 is always free to turn in the outer ring 57 whenever the flexible shaft 18 is rotated. Thus, the stem 25' and lamp 8 can be turned to any position in the horizontal plane. By now pushing or pulling on the control handle 12, the lamp can be rocked forward or back in any horizontal position to which the lamp may have been turned. Obviously, the operation of the control mechanism is such that the lamp can be rocked forward or back to any predetermined angle and then revolved, whereby the ray of light from the lamp may be made to inscribe circles either above or below the horizontal plane and substantially parallel thereto.

In the adaptation shown in Fig. 2, substantially the same general construction of lamp mounting illustrated in Fig. 4 is employed, the lower member 28', however, having a suitable bracket extension 67 for attachment to the automobile body, in lieu of the extending flange which is designed particularly for the fender. The flexible shaft may be arranged to extend straight down from the bracket 67 and enter the car through an opening 68 in the cowl or adjacent part of the automobile body. The control handle for the lamp may be very conveniently located on the dash, which the present figure is intended to disclose. Here, the tubular guide or housing 16 is passed through an opening in the dash 69 and has a suitable escutcheon plate or cap 71 for securing the guide or housing in the dash. The flexible characteristic of the present operating shaft permits the shaft to be doubled back in a relatively sharp curve and extended from the end of the housing 16 up through the hole 68 in the cowl or other part of the tonneau. This is commented upon, for the purpose of illustrating the adaptability of the present control device to any angle, position or location most desirable to the driver without consideration of the location of the lamp or the angles and bends through which the shaft must be passed in extending to the lamp.

In Figure 7, the lamp is illustrated as having this same mounting outside of the automobile body, but the tubular guide or housing 16 is mounted on the steering column, similarly to Figure 1. The flexible shaft preferably extends through the side portion of the cowl sheet.

In Figure 1 the flexible shaft passes out of the body of the car through an opening 73, preferably in the cowl portion, and extends along the sill or ledge co-extensive with the bottom of the engine hood. From this sill or ledge, the shaft may be extended upwardly along the inner apron of the fender 9 and be passed into the under side of the fender through a hole 74 in the side apron portion.

I do not intend to be limited to the particular details herein shown and described, except as they are defined in the appended claims.

I claim:

1. The combination with an automobile having a closed body provided with an opening therethrough, of an outer bracket mounted on the outside of the automobile body, of an inner guide mounted in the driver's compartment, a lamp supporting member pivotally mounted on said outer bracket, a spot lamp on said supporting member, a section of rigid shaft journaled in said inner guide for rotation and reciprocation therein, a handle mounted on the projecting end of said rigid shaft, a flexible sheath connected to said inner guide and extending through said opening and connecting at its outer end to said bracket, a flexible shaft connected to said section of rigid shaft and extending through said flexible sheath for transmission of lamp adjusting motion to said spot lamp, said flexible shaft being reciprocable in said sheath for transmitting lamp adjusting motion in one plane and rotatable in said sheath for transmitting lamp adjusting motion in another plane, said flexible shaft comprising a strand of twisted flexible material for obtaining a resilient flexibility at each and every point of said shaft, and an electrical conductor threaded through said flexible shaft for supplying current to the bulb of said lamp.

2. In combination, an inside-control automobile spot light, control mechanism comprising a sleeve, a rigid shaft rotatably and reciprocably mounted in said sleeve, an operating handle on the outer end of said shaft, a tubular flexible sheath secured to the end of said sleeve, a flexible shaft connected to said rigid shaft, means operatively connecting said flexible shaft with said spot light, an electric circuit for said spot light comprising an electric wire threaded through said tubular flexible shaft to said spot light, and electrical conducting means passing through an opening in said rigid shaft and through an opening in said sleeve said wire having a portion of slack intermediate said openings to permit the reciprocatory and rotary motions of said rigid shaft.

In witness whereof, I hereunto subscribe my name this 25th day of March, 1922.

CAMERON A. WHITSETT.